United States Patent
Kwon et al.

(10) Patent No.: US 7,826,473 B2
(45) Date of Patent: Nov. 2, 2010

(54) METHOD AND APPARATUS FOR TRANSMITTING AND RECEIVING DATA IN WIRELESS NETWORK

(75) Inventors: Chang-yeul Kwon, Yongin-si (KR); Ho-seok Lee, Anyang-si (KR); Jae-hwa Kim, Suwon-si (KR); Jae-min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 703 days.

(21) Appl. No.: 11/449,851

(22) Filed: Jun. 9, 2006

(65) Prior Publication Data

US 2006/0280155 A1    Dec. 14, 2006

(30) Foreign Application Priority Data

Jun. 9, 2005 (KR) .................. 10-2005-0049444
Nov. 30, 2005 (KR) .................. 10-2005-0115922

(51) Int. Cl.
*H04L 12/413* (2006.01)

(52) U.S. Cl. .............. 370/445; 370/448; 370/454; 370/441

(58) Field of Classification Search ............. 370/445, 370/448, 454, 480, 441, 442
See application file for complete search history.

(56) References Cited

U.S. PATENT DOCUMENTS

| 7,349,436 B2* | 3/2008 | Maltsev et al. .............. 370/471 |
| 2002/0126650 A1 | 9/2002 | Hall et al. |
| 2003/0133469 A1 | 7/2003 | Brockmann et al. |
| 2004/0029590 A1 | 2/2004 | Wentink |
| 2004/0242252 A1 | 12/2004 | Hoeben |
| 2004/0258025 A1 | 12/2004 | Li et al. |
| 2005/0111449 A1 | 5/2005 | Moorti et al. |
| 2005/0152314 A1 | 7/2005 | Sun et al. |
| 2005/0165950 A1* | 7/2005 | Takagi et al. ................. 709/236 |
| 2005/0180314 A1 | 8/2005 | Webster et al. |
| 2005/0220208 A1 | 10/2005 | Aoki |
| 2005/0243843 A1 | 11/2005 | Imamura et al. |
| 2005/0282551 A1 | 12/2005 | Tandai et al. |
| 2006/0115012 A1 | 6/2006 | Sadowsky et al. |

FOREIGN PATENT DOCUMENTS

CN    1460346 A    12/2003

(Continued)

OTHER PUBLICATIONS

Tiantong You, et al.: "DRCE: A high throughput QoS protocol for wireless ad hoc networks", Computers and Communications, 2005., ISCC. Proceedings. 10th IEEE Symposium on, Jun. 27-30, 2005, pp. 671-676.

*Primary Examiner*—Yuwen Pan
(74) *Attorney, Agent, or Firm*—Sughrue Mion, PLLC

(57) ABSTRACT

A method and an apparatus are provided for enabling a legacy station to perform virtual carrier sensing when a plurality of stations with heterogeneous capabilities coexist in a wireless network. The method includes receiving first data via a bonded channel formed by channel bonding first and second adjacent channels, and transmitting second data via each of the first and second adjacent channels, the second data being a clear-to-send (CTS) frame or a request-to-send (RTS) frame.

12 Claims, 8 Drawing Sheets

FOREIGN PATENT DOCUMENTS

| | | |
|---|---|---|
| EP | 1594259 A1 | 11/2005 |
| TW | I257219 | 6/2006 |
| WO | 2005/018180 A1 | 2/2005 |
| WO | 2005039105 A1 | 4/2005 |
| WO | WO 2005/039105 A1 | 4/2005 |
| WO | 2005/046113 A2 | 5/2005 |

* cited by examiner

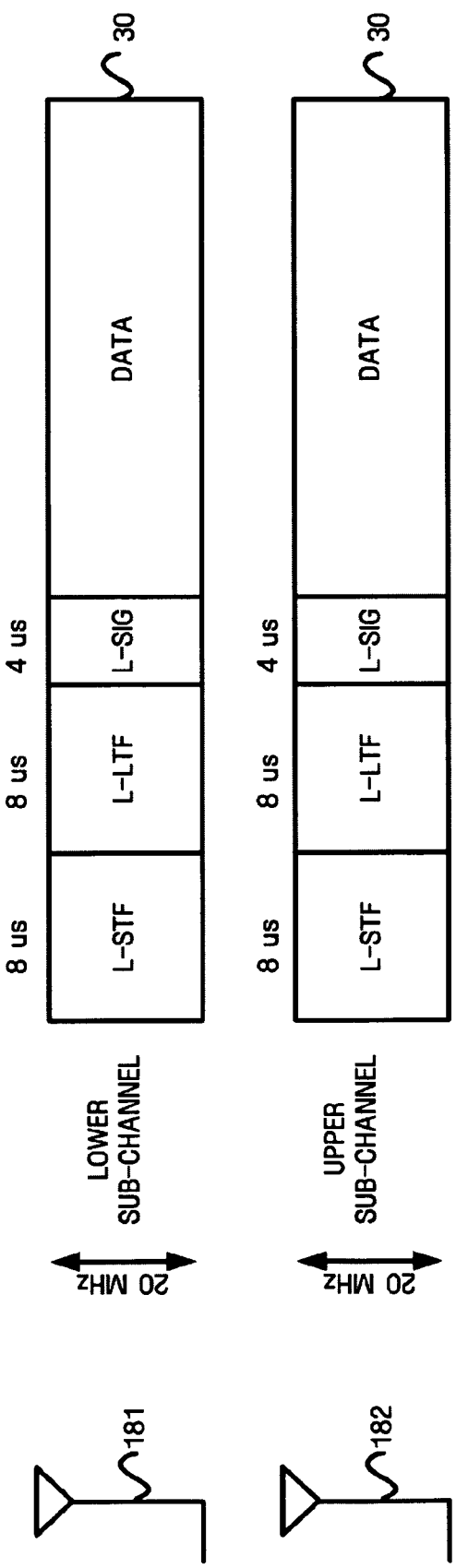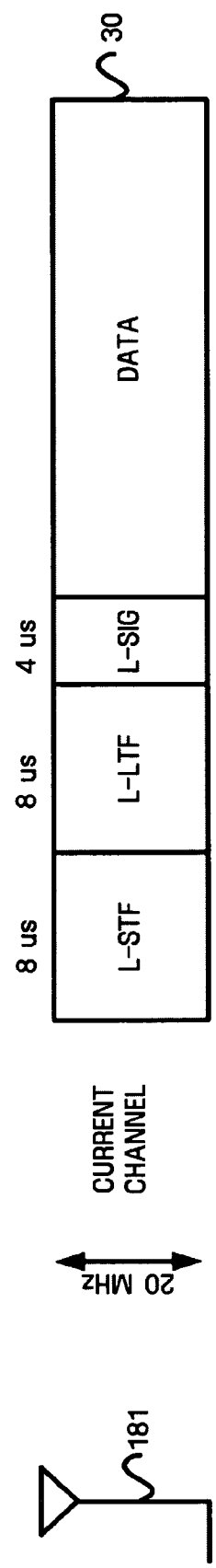

METHOD AND APPARATUS FOR TRANSMITTING AND RECEIVING DATA IN WIRELESS NETWORK

CROSS-REFERENCE TO RELATED APPLICATIONS

This application claims priority from Korean Patent Application Nos. 10-2005-0049444 and 10-2005-0115922 filed on Jun. 9, 2005 and Nov. 30, 2005, respectively, the disclosures of which are incorporated herein in their entireties by reference.

BACKGROUND OF THE INVENTION

1. Field of the Invention

Methods and apparatuses consistent with the present invention relate to transmitting and receiving legacy format data in a high throughput wireless network.

2. Description of the Related Art

Recently, there has been an increasing demand for ultra high-speed communication networks due to widespread public use of the Internet and a rapid increase in the amount of available multimedia data. Since local area networks (LANs) emerged in the late 1980s, the data transmission rate over the Internet has drastically increased from about 1 Mbps to about 100 Mbps. Thus, high-speed Ethernet transmission has gained popularity and wide spread use. Currently, intensive research into a gigabit-speed Ethernet is under way. An increasing interest in the wireless network connection and communication has triggered research into and development of wireless LANs (WLANs), and greatly increased availability of WLANs to consumers. Although use of WLANs may reduce performance due to lower transmission rate and poorer stability as compared to wired LANs, WLANs have various advantages, including wireless networking capability, greater mobility and so on. Accordingly, WLAN markets have been gradually growing.

Due to the need for a higher transmission rate and the development of wireless transmission technology, the initial Institute of Electrical and Electronics Engineers (IEEE) 802.11 standard, which specifies a transfer rate of 1 to 2 Mbps, has evolved into advanced standards including IEEE 802.11a, 802.11b and 802.11g. The IEEE 802.11g standard, which utilizes a transmission rate of 6 to 54 Mbps in the 5 GHz-National Information Infrastructure (NII) band, uses orthogonal frequency division multiplexing (OFDM) as its transmission technology. With an increasing public interest in OFDM transmission and use of a 5 GHz-band, much greater attention is been paid to the IEEE 802.11g standard and OFDM transmission technology than to other wireless standards.

Recently, wireless Internet services using WLAN, so-called "Nespot," have been launched and offered by Korea Telecommunication (KT) Corporation of Korea. Nespot services allow access to the Internet using a WLAN according to IEEE 802.11b standard, commonly called Wi-Fi (wireless fidelity). Communication standards for wireless data communication systems, which have been completed and promulgated or are being researched and discussed, include Wide Code Division Multiple Access (WCDMA), IEEE 802.11x, Bluetooth, IEEE 802.15.3, etc., which are known as 3rd Generation (3G) communication standards. The most widely known, cheapest wireless data communication standard is IEEE 802.11b, a series of IEEE 802.11x. An IEEE 802.11b WLAN standard delivers data transmission at a maximum rate of 11 Mbps and utilizes the 2.4 GHz-Industrial, Scientific, and Medical (ISM) band, which can be used below a predetermined electric field without permission. With the recent widespread use of the IEEE 802.11a WLAN standard, which delivers a maximum data rate of 54 Mbps in the 5 GHz-band by using OFDM, IEEE 802.11g developed as an extension to the IEEE 802.11a standard for data transmission in the 2.4 GHz-band using OFDM and is intensively being researched.

The Ethernet and the WLAN, which are currently being widely used, both utilize a carrier sensing multiple access (CSMA) method. According to the CSMA method, it is determined whether a channel is in use. If the channel is not in use, that is, if the channel is idle, then data is transmitted. If the channel is busy, retransmission of data is attempted after a predetermined period of time has elapsed. A carrier sensing multiple access with collision detection (CSMA/CD) method, which is an improvement of the CSMA method, is used in a wired LAN, whereas a carrier sensing multiple access with collision avoidance (CSMA/CA) method is used in packet-based wireless data communications. In the CSMA/CD method, a station suspends transmitting signals if a collision is detected during transmission. Compared with the CSMA method, which pre-checks whether a channel is occupied before transmitting data, in the CSMA/CD method, the station suspends transmission of signals when a collision is detected during the transmission of signals and transmits a jam signal to another station to inform it of the occurrence of the collision. After the transmission of the jam signal, the station has a random backoff period for delay and restarts transmitting signals. In the CSMA/CD method, the station does not transmit data immediately even after the channel becomes idle and has a random backoff period for a predetermined duration before transmission to avoid collision of signals. If a collision of signals occurs during transmission, the duration of the random backoff period is increased by two times, thereby further lowering a probability of collision.

The CSMA/CA method is classified into physical carrier sensing and virtual carrier sensing. Physical carrier sensing refers to the physical sensing of active signals in the wireless medium. Virtual carrier sensing is performed such that information regarding duration of a medium occupation is set to a media access control (MAC) protocol data unit/physical (PHY) service data unit (MPDU/PSDU) and transmission of data is then started after the estimated duration has elapsed. However, if the MPDU/PSDU cannot be interpreted, the virtual carrier sensing mechanism cannot be adopted.

IEEE 802.11n provides coverage for IEEE 802.11a networks at 5 GHz and IEEE 802.11g networks at 2.4 GHz and enables stations of various data rates to coexist. For operating the stations of various data rates using the CSMA/CA method, the stations must interpret MPDU/PSDU. However, some stations, that is, legacy stations, may not often process data transmitted/received at high rates. In such a case, the legacy stations cannot perform virtual carrier sensing.

FIG. 1 is a data structure of a related art format Physical Layer Convergence Procedure (PLCP) Protocol Data Unit (PPDU) as defined by the IEEE 802.11a protocol. The PPDU includes a PLCP header and Physical Layer Service Data Unit (PSDU). A data rate field 3 and a data length field 4 are used to determine a length of a data field that follows the PLCP header of the PPDU. The data rate field 3 and the data length field 4 are also used to determine the time of the data being received or transmitted, thereby performing virtual carrier sensing. In addition, in a case where a Message Protocol Data Unit (MPDU) is accurately filtered from the received PPDU, a "Dur/ID" field, which is one field among the header fields of the MPDU, is interpreted and the medium is virtually determined to be busy for an expected use time period of the medium. In a case where a preamble field and a signal field of a PPDU frame being received are only erroneously interpreted, media may attempt data transmission by a backoff at a predetermined Extended Inter-Frame Space (EIFS), which is longer than a Distributed Coordination Function (DCF) Inter-Frame Space (DIFS), so that fairness in media access of all stations available in DCF is not ensured.

In a network where an existing station using a conventional protocol or a legacy station and a High Throughput (HT) station coexist, the legacy station may be upgraded for transmission and reception of HT data. However, a legacy station or a conventional station cannot perform virtual carrier sensing because these stations cannot interpret the "Dur/ID" field present in the data which was transmitted and received by the HT station.

FIG. 2 is a diagram illustrating that a legacy station with a low transmission rate is incapable of performing virtual carrier sensing when a plurality of stations having a variety of transmission capabilities coexist.

A transmitter-side high throughput station (abbreviated as transmitter-side HT STA) 101 is a station complying with the IEEE 802.11n protocols and operating using a channel bonding technique or a multiple input multiple output (MIMO) technique. Channel bonding is a mechanism in which data frames are simultaneously transmitted over two adjacent channels. In other words, according to a channel bonding technique, since two adjacent channels are bonded during data transmission, channel extension exists. The MIMO technique is one type of adaptive array antenna technology that electrically controls directivity using a plurality of antennas. Specifically, in an MIMO system, directivity is enhanced using a plurality of antennas by narrowing a beam width, thereby forming a plurality of transmission paths that are independent from one another. Accordingly, a data transmission speed of a device that adopts the MIMO system increases as many times as there are antennas in the MIMO system. In this regard, when data is transmitted/received using the channel bonding or MIMO technique, capable stations can read the transmitted/received data but incapable stations, i.e., legacy stations, cannot read the transmitted/received data. Physical carrier sensing enables a physical layer to inform an MAC layer whether a channel is busy or idle by detecting whether the physical layer has received a predetermined level of reception power. Thus, the physical carrier sensing is not associated with interpreting of data transmitted and received.

If the transmitter-side HT STA 101 transmits HT data, a receiver-side HT STA 102 receives the HT data and transmits an HT acknowledgement (Ack) to the transmitter-side HT STA 101 in response to the received HT data. An additional HT STA 103 is able to interpret the HT data and the HT Ack. Assuming a duration in which the HT data and the HT Ack are transmitted and received, is set to a Network Allocation Vector (NAV), the medium is considered as being busy. Then, the additional HT STA 103 waits for an DIFS after the lapse of an NAV period of time, and then performs a random backoff, and finally transmits data.

Meanwhile, a legacy station 201 is a station complying with the IEEE 802.11a, 802.11b, or 802.11g protocols but is incapable of interpreting HT data. Thus, after a duration of the HT Ack is checked by physical carrier sensing, the legacy station 201 waits for the duration of an EIFS and then perform a backoff. Thus, the legacy station 201 waits longer than other stations, that is, the transmitter-side HT STA 101, the receiver-side HT STA 102 and the additional HT STA 103, before being assigned media, thereby adversely affecting data transmission efficiency.

The IEEE 802.11 standard specifies a control response frame, such as an ACK, a Request-to-Send (RTS) or a Clear-to-Send (CTS) frame, is transmitted at the same data rate as the directly previous frame. However, if the control response frame cannot be transmitted at the same data rate as the directly previous frame, it must be transmitted at a highest rate in a basic service set (BSS) as specified in the IEEE 802.11 standard. In addition, unlike the legacy format data, the HT data has HT preamble and HT signal fields added thereto, which leads to an increase in the overhead of an PPDU-, which may cause the ACK frame to result in deteriorated performance compared to the legacy format PPDU. That is to say, the length of the legacy format PPDU complying with the IEEE 802.11a standard is approximately 20 μs while the length of a newly defined HT PPDU is 40 μs or greater.

Consequently, there exists a need for enhancing performance of network utilization by transmitting legacy format data, e.g., an ACK frame, without an HT preamble when a legacy station cannot interpret data transmitted from an HT station, which may prevent virtual carrier sensing from being performed properly.

SUMMARY OF THE INVENTION

The present invention provides a method and apparatus for enabling station with low capability to perform virtual carrier sensing when a plurality of stations with heterogeneous capabilities coexist in a wireless network.

The present invention also provides a method and apparatus for transmitting short data for high efficiency.

According to an aspect of the present invention, there is provided a method of transmitting data in a wireless network, the method comprising accessing a wireless network, receiving first data using channel bonding, the first data transmitted from a station having accessed the wireless network, and transmitting second data to respective channels associated with the channel bonding, the second data being a clear-to-send (CTS) frame or a request-to-send (RTS) frame.

According to yet another aspect of the present invention, there is provided a wireless network apparatus comprising a receiving unit accessing a wireless network and receiving first data transmitted from a station having accessed the wireless network using channel bonding, and a transmitting unit transmitting second data to channels associated with the channel bonding, the second data being a clear-to-send (CTS) frame or a request-to-send (RTS) frame.

BRIEF DESCRIPTION OF THE DRAWINGS

The above and other aspects of the present invention will become more apparent by describing in detail exemplary embodiments thereof with reference to the attached drawings in which:

FIG. 6 is a diagram showing a procedure in which a receiving unit transmits a legacy response frame when a transmitting unit transmits an HT data using channel bonding according to another exemplary embodiment of the present invention;

FIG. 7 is a diagram showing a procedure in which a receiving unit transmits a legacy response frame when the transmitting unit transmits an HT data without using channel bonding;

DETAILED DESCRIPTION OF EXEMPLARY EMBODIMENTS OF THE PRESENT INVENTION

Figure 1:
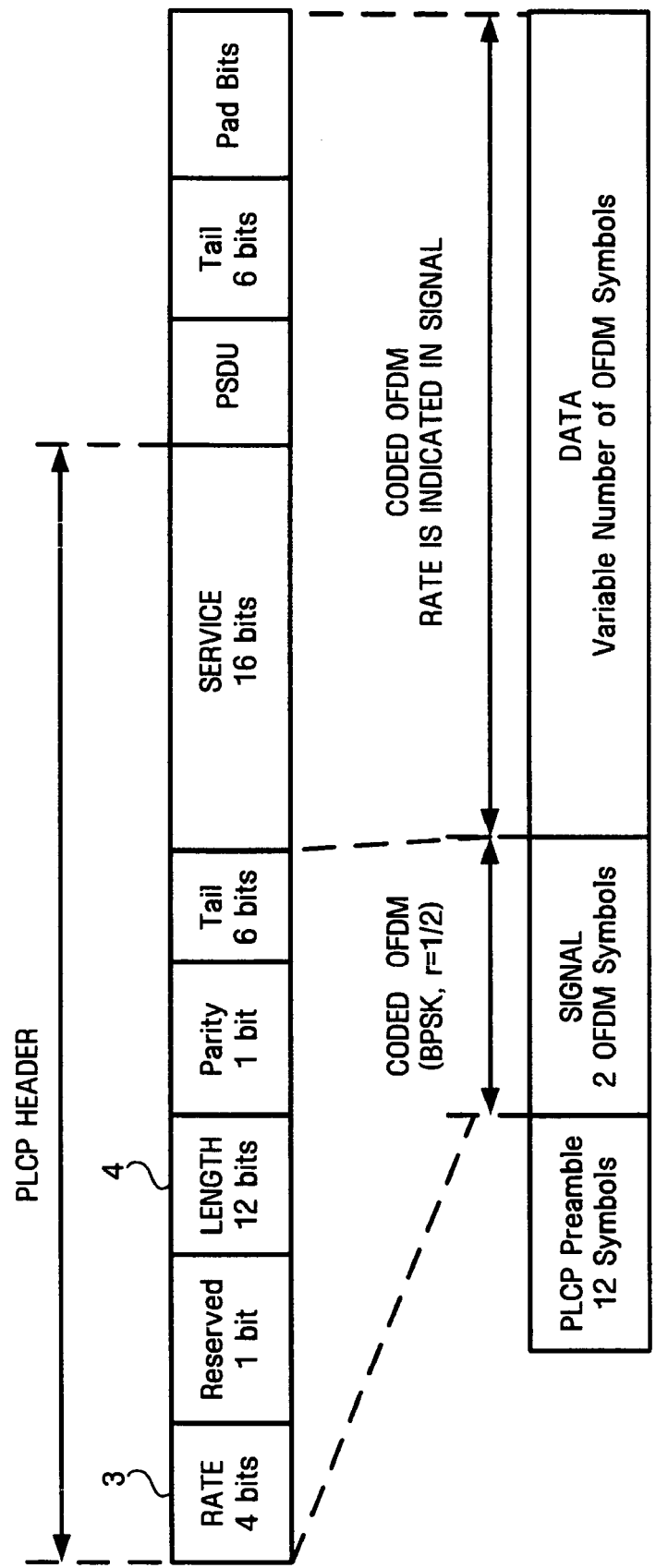
FIG. 1 is a schematic diagram of a related art format PPDU as defined by the IEEE 802.11 protocol.
Figure 2:
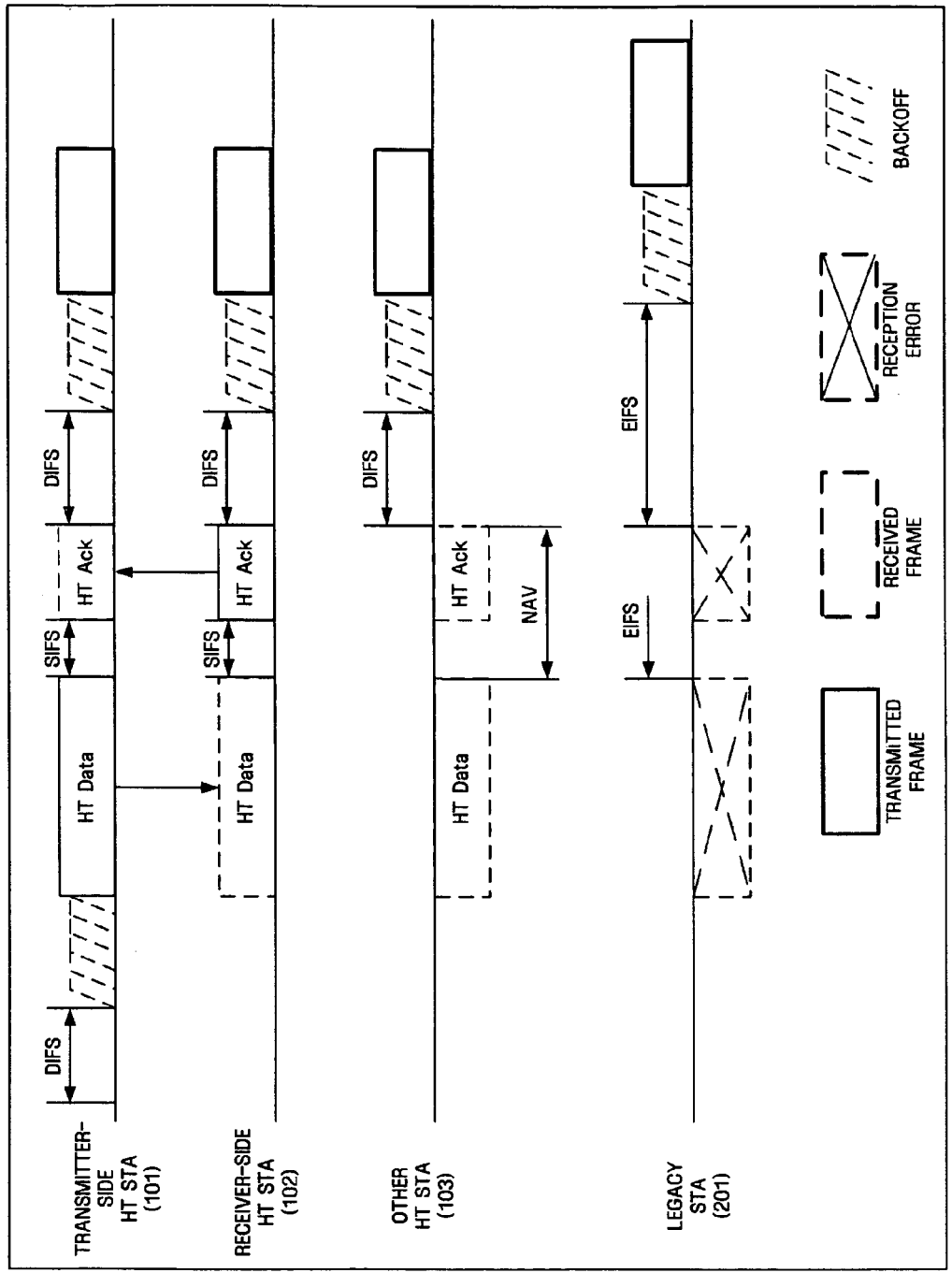
FIG. 2 is a diagram illustrating that a legacy station with a low transmission rate is incapable of performing virtual carrier sensing when a plurality of stations having a variety of transmission capabilities coexist.

The present invention and methods of accomplishing the same may be understood more readily by reference to the following detailed description of exemplary embodiments and the accompanying drawings. The present invention may, however, be embodied in many different forms and should not be construed as being limited to exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

A method and apparatus for transmitting and receiving legacy format data in an HT wireless network is described hereinafter with reference to flowchart illustrations of methods according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Each block of the flowchart illustrations may represent a module, segment, or portion of code, which comprises one or more executable instructions for implementing the specified logical functions. It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

HT wireless networks according to exemplary embodiments of the present invention include wireless networks capable of transmitting and receiving HT data, e.g., an HT wireless network complying with the IEEE 802.11n protocol, a wireless network having compatibility with one of the legacy format IEEE 802.11a, 802.11b, and 802.11g standards, and so on.

Figure 3:
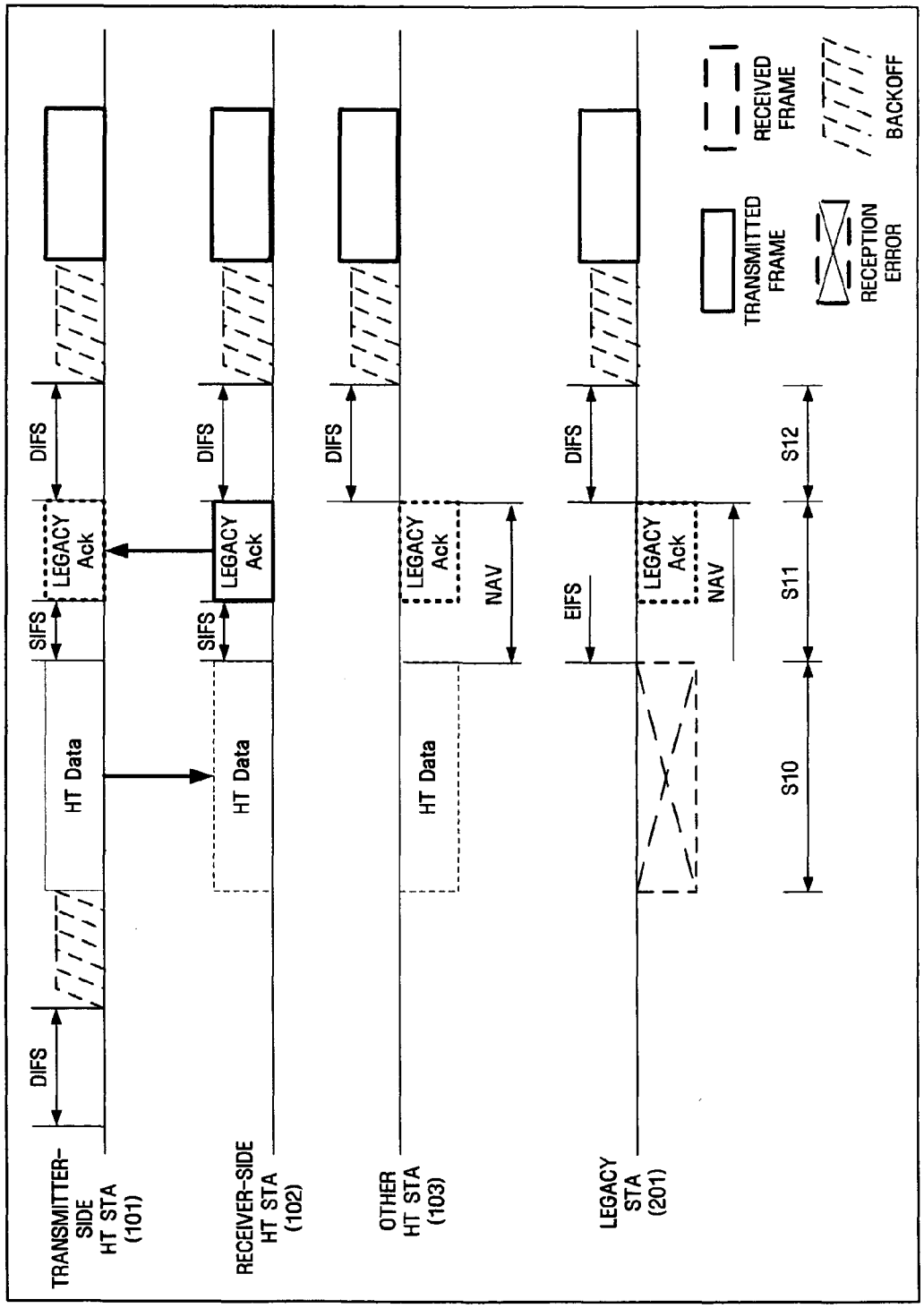
FIG. 3 is a diagram illustrating a method of transmitting a response frame according to an exemplary embodiment of the present invention.

FIG. 3 is a diagram illustrating a method of transmitting a response frame according to an exemplary embodiment of the present invention.

Referring to FIG. 3, a transmitter-side HT STA 101, a receiver-side HT STA 102, an additional HT STA 103, and a legacy station 201 exist in a wireless network. In operation S10, the transmitter-side HT STA 101 transmits HT data to the receiver-side HT STA 102. As stated above, the HT data is transmitted at a high rate using a channel bonding or MIMO technique. The HT stations include stations enabling high rate data transmission, e.g., stations in compliance with the IEEE 802.11n protocol. Since the receiver-side HT STA 102 and the additional HT STA 103 can interpret HT data, they perform virtual carrier sensing. However, since the legacy station 201 is not capable of interpreting HT data, it cannot perform virtual carrier sensing. Instead, the legacy station determines that a medium is currently busy, thereby performing physical carrier sensing. After completing of transmission of the HT data, operation S11 begins and the legacy station 201 waits for the duration of an EIFS before it performs a backoff.

If the transmitter-side HT STA 101 completes transmission of the HT data, the procedure goes to operation S11. At this time, the receiver-side HT STA 102 transmits a legacy Ack after a duration of a short inter-frame space (SIFS) to the transmitter-side HT STA 101. The legacy Ack is a response frame generated according to the IEEE 802.11a, 802.11b, or 802.11g protocol. The legacy Ack can be transmitted to and received from both a legacy station and an HT station. After receiving each legacy Ack, each of the HT stations 101, 102, and 103 capable of interpreting a legacy response frame goes to operation S12 after the duration of a DIFS, and then performs a backoff procedure.

In addition, since the legacy station 201 is capable of interpreting a legacy Ack frame but incapable of interpreting HT data, it is allowed to wait for the duration of the DIFS in operation S12 to prohibit the legacy station 201 from performing the backoff procedure. Consequently, the legacy station 201 is able to participate in the backoff procedure as well as the HT stations 101, 102, and 103, thereby avoiding performance deterioration.

Figure 4A:
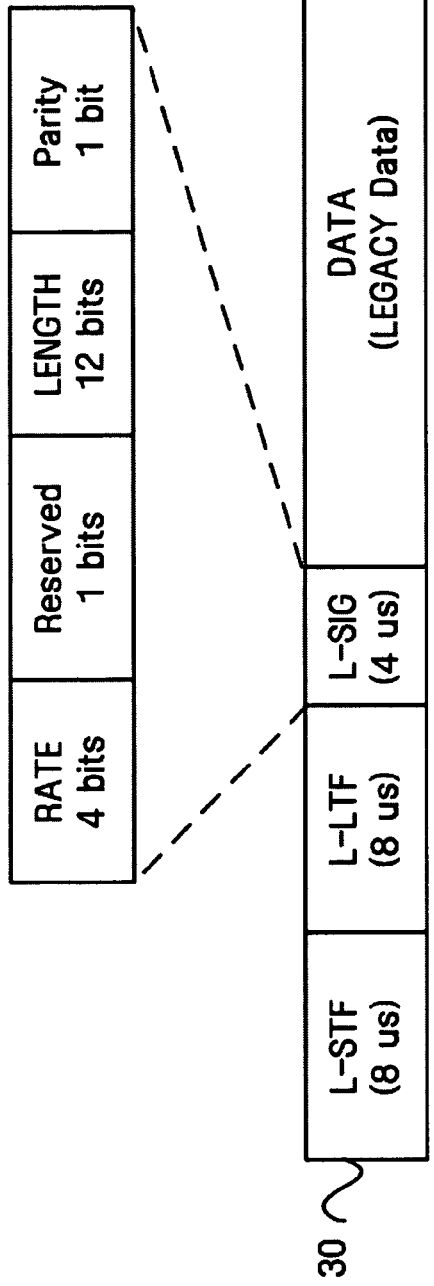
FIGS. 4A and 4B are diagrams illustrating data structures of a PPDU transmitted and received by an HT station.
Figure 4B:
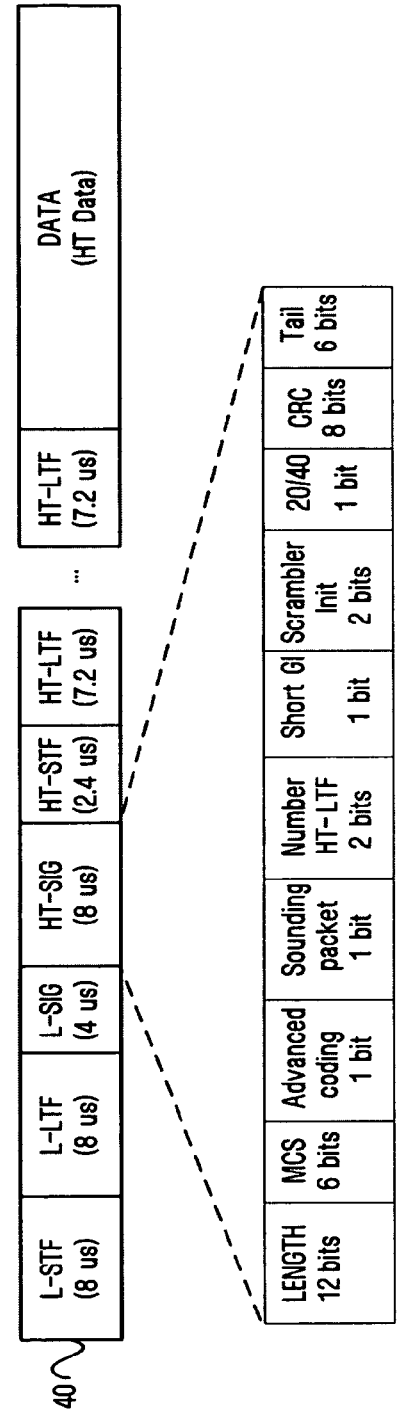

FIGS. 4A and 4B are diagrams illustrating a data structure of a PPDU transmitted and received by an HT station.

The HT station enables data transmission and reception in two ways, both of which start with legacy preambles, so that a legacy station can interpret data transmitted/received by the HT station with legacy preamble.

As shown in FIG. 4A, a legacy format PPDU 30 includes a legacy preamble including a Legacy Short Training Field (L-STF), a Legacy Long Training Field (L-LTF) and a Legacy Signal Field (L-SIG), and a Legacy Data (DATA) payload. Similar to FIG. 1, the L-SIG includes RATE, Reserved, LENGTH, and Parity fields. The legacy format PPDU 30 has the DATA payload following the L-STF, L-LTF, L-SIG fields containing information regarding power management, signal and so on, respectively. Thus, the legacy format PPDU 30 can be interpreted by both an HT station and a legacy station.

As shown in FIG. 4B, when a PPDU 40 has an HT preamble added to a legacy preamble, the HT station considers the PPDU 40 as being HT data. The HT preamble contains information regarding HT data. The HT preamble consists of an HT signal field (HT-SIG), an HT short training field (HT-STF), and an HT long training field (HT-LTF). In detail, the HT-SIG consists of multiple fields including a LENGTH field defining a length of HT data, an MCS field defining modulation and coding schemes, an Advanced coding field specifying the presence of advanced coding, a Sounding packet field indicating whether transmission has been performed on all antennas, a number HT-LTF field specifying the number of HT-LTFs in a transmitted PPDU, a Short GI field specifying a short guard interval in a data region of a frame, a ScramblerINIT field specifying an initial value of a scrambler, 20/40 indicating whether the PPDU is converted into a signal at a bandwidth of 20 or 40 MHz, a CRC field for error checking, and a Tail field. As shown in FIG. 4B, HT-SIG, HT-STF, HT-SIG, ..., HT-LTF, each contain a specific number of bits, followed by HT data.

As shown in FIG. 4B, if short data is transmitted in the HT PPDU 40, a considerable increase in the HT preamble is caused, thereby significantly increasing overhead. Thus, in order to transmit frames including only short data, e.g., Ack or control frames, it is efficient to use the legacy PPDU 30. In addition, the legacy PPDU 30 enables a legacy station to perform virtual carrier sensing when the legacy station exists in a wireless network.

Figure 5:
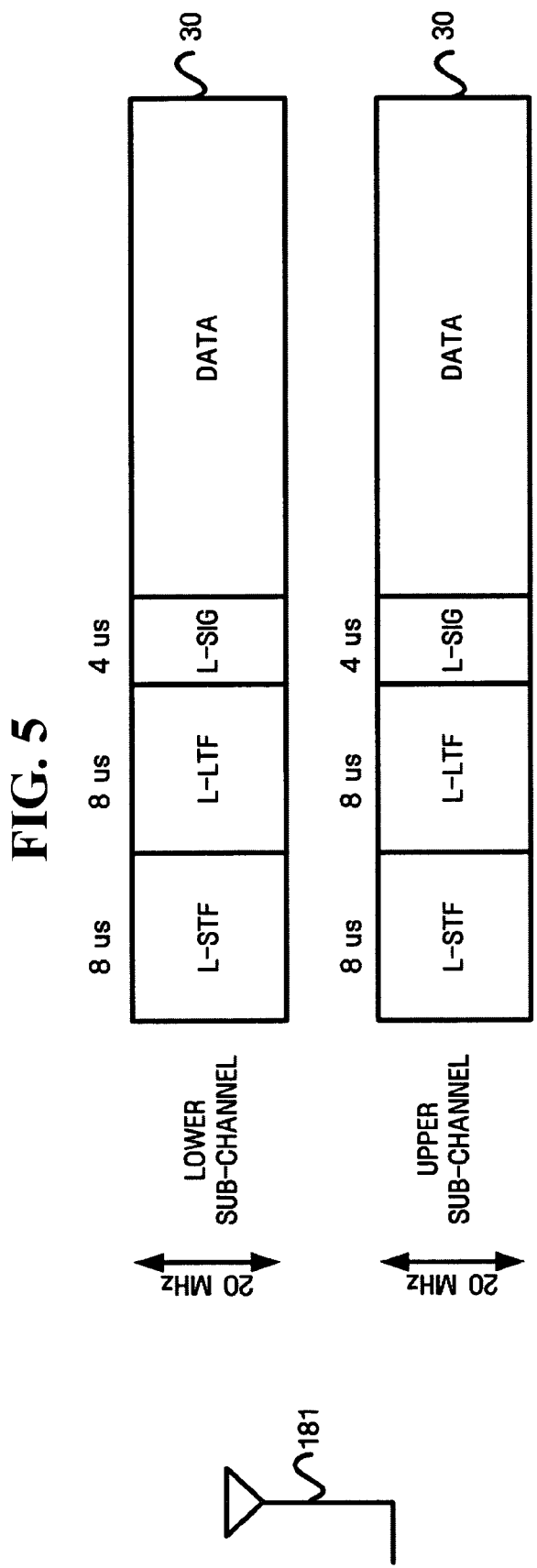
FIG. 5 is a diagram showing a procedure in which a receiving unit transmits a legacy response frame when a transmitting unit transmits an HT data using channel bonding according to an exemplary embodiment of the present invention.

FIG. 5 is a diagram showing a procedure in which a receiving unit transmits a legacy response frame when a transmitting unit transmits an HT data using channel bonding according to an exemplary embodiment of the present invention.

When a transmitting unit selects two adjacent channels of a current channel, that is, the current channel and a directly next channel or a directly previous channel and the current channel, bonded to each other, and transmits the same to a receiving unit, the receiving unit receives the same and transmits a legacy Ack to each channel.

FIG. 6 is a diagram showing a procedure in which a receiving unit transmits a legacy response frame when a transmitting unit transmits an HT data using channel bonding according to another exemplary embodiment of the present invention, in which antennas 181 and 182 transmit data to different channels, unlike in FIG. 5.

When the transmitting unit selects two adjacent channels of a current channel, that is, the current channel and a directly next channel or a directly previous channel and the current channel, bonded to each other, and transmits the same to the receiving unit, the receiving unit receives the same and transmits a legacy Ack to either channel. Unlike in FIG. 5, the respective antennas 181 and 182 are capable of handling different channels. The receiving unit accesses lower and upper sub-channels using the respective antennas 181 and 182 and transmits the same legacy Ack frame 300. A structure of a legacy format frame is the same as described in FIG. 4.

Legacy format data is simultaneously transmitted to both a control channel and an extension channel in response to a frame transmitted using channel bonding, as shown in FIGS. 5 and 6, which allows the legacy format data to be received by stations in the extension channel as well.

FIG. 7 is a diagram showing a procedure in which a receiver-side HT station transmits a legacy response frame when the transmitter-side HT station transmits HT data using an MIMO technique according to an exemplary embodiment of the present invention.

When the transmitter-side HT station transmits HT data using an MIMO technique, the receiver-side HT station utilizes one antenna 181 to transmit a legacy response frame via a current channel. The transmitter-side HT station is capable of receiving the legacy response frame received through the current channel. Other HT stations can interpret the legacy response frame to enable virtual carrier sensing. Further, legacy stations communicating via the current channel can also interpret the legacy response frame to enable virtual carrier sensing. A structure of a legacy format frame is the same as described in FIG. 4A.

As illustrated in FIGS. 5 through 7, the receiver-side HT STA 102 transmits the legacy PPDU 30 in various manners according to the transmission method employed by the transmitter-side HT STA 101. The receiver-side HT STA 102 can be informed of the transmission method employed by the transmitter-side HT STA 101 from MCS values in the HT-SIG field of the HT PPDU shown in FIG. 4B. That is, the number of antennas used in data transmission or the number of spatial streams, modulation schemes used, coding rate, guard interval, and use or non-use of channel bonding (40 MHz) can be deduced from the MCS values enumerated in the Table below. Table 1 illustrates an exemplary modulation and coding scheme (MCS) table.

TABLE 1

| MCS | Number of streams | Modulation schemes | Coding rate | GI = 800ns | | GI = 400 ns | |
| --- | --- | --- | --- | --- | --- | --- | --- |
| | | | | 20 MHz | 40 MHz | 20 MHz | 40 MHz |
| 0 | 1 | BPSK | 1/2 | 6.50 | 13.50 | 7.22 | 15.00 |
| 1 | 1 | QPSK | 1/2 | 13.00 | 27.00 | 14.44 | 30.00 |
| 2 | 1 | QPSK | 3/4 | 19.50 | 40.50 | 21.67 | 45.00 |
| 3 | 1 | 16-QAM | 1/2 | 26.00 | 54.00 | 28.89 | 60.00 |
| 4 | 1 | 16-QAM | 3/4 | 39.00 | 81.00 | 43.33 | 90.00 |
| 5 | 1 | 64-QAM | 2/3 | 52.00 | 108.00 | 57.78 | 120.00 |
| 6 | 1 | 64-QAM | 3/4 | 58.50 | 121.50 | 65.00 | 135.00 |
| 7 | 1 | 64-QAM | 5/6 | 65.00 | 135.00 | 72.22 | 150.00 |
| 8 | 2 | BPSK | 1/2 | 13.00 | 27.00 | 14.44 | 30.00 |
| 9 | 2 | QPSK | 1/2 | 26.00 | 54.00 | 28.89 | 60.00 |
| 10 | 2 | QPSK | 3/4 | 39.00 | 81.00 | 43.33 | 90.00 |
| 11 | 2 | 16-QAM | 1/2 | 52.00 | 108.00 | 57.78 | 120.00 |
| 12 | 2 | 16-QAM | 3/4 | 78.00 | 162.00 | 86.67 | 180.00 |
| 13 | 2 | 64-QAM | 2/3 | 104.52 | 216.00 | 116.13 | 240.00 |
| 14 | 2 | 64-QAM | 3/4 | 117.00 | 243.00 | 130.00 | 270.00 |

TABLE 1-continued

| MCS | Number of streams | Modulation schemes | Coding rate | GI = 800ns | | GI = 400 ns | |
| --- | --- | --- | --- | --- | --- | --- | --- |
| | | | | 20 MHz | 40 MHz | 20 MHz | 40 MHz |
| 15 | 2 | 64-QAM | 5/6 | 130.00 | 270.00 | 144.44 | 300.00 |
| 16 | 3 | BPSK | 1/2 | 19.50 | 40.50 | 21.67 | 45.00 |

An HT station can transmit not only the Ack frame but also an PPDU of a control frame including short data such as a CTS frame or an RTS frame. During legacy format transmission, it is not necessary add an HT preamble to the data, a legacy station can perform virtual carrier sensing, thereby reducing overhead.

In a case of a considerable amount of data, an HT format PPDU is transmitted. In a case of short data, that is, a small amount of data, e.g., a control frame, a legacy format PPDU is transmitted, thereby reducing a total amount of data transmitted and received in the overall wireless network and implementing a wireless network in which the HT station and a legacy station coexist.

The term "unit" as used herein, means, but is not limited to, a software or hardware component or module, such as a Field Programmable Gate Array (FPGA) or Application Specific Integrated Circuit (ASIC), which performs certain tasks. A unit may advantageously be configured to reside on the addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and modules or further separated into additional components and units. In addition, the components and units may be implemented such that they are executed on one or more CPUs in a communication system.

Figure 8:
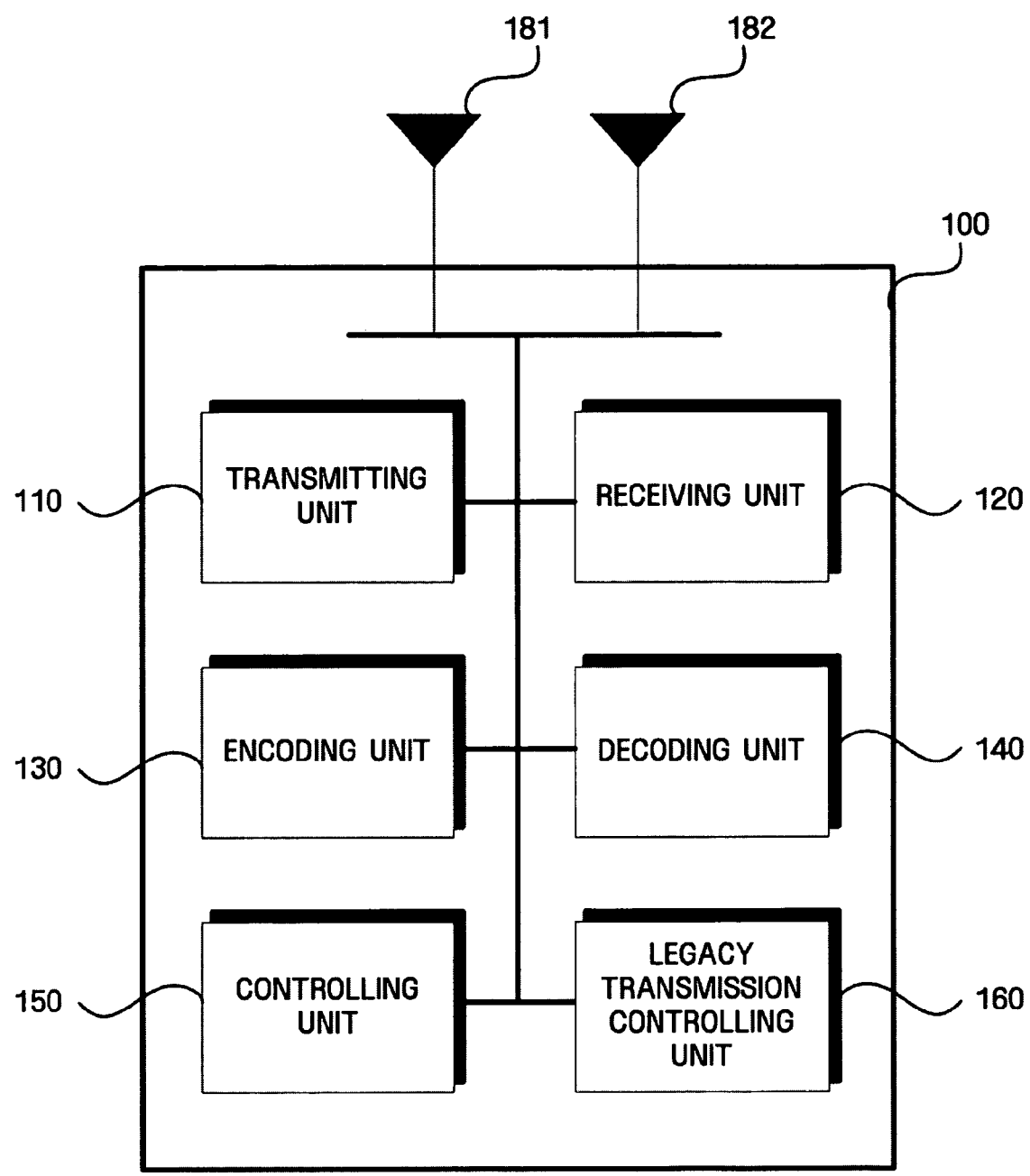
FIG. 8 is a schematic illustrating an HT station of transmitting legacy format data according to an embodiment of the present invention.

FIG. 8 is a schematic illustrating an HT station which transmits legacy format data according to an exemplary embodiment of the present invention. The HT station 100 includes a transmitting unit 110, a receiving unit 120, an encoding unit 130, a decoding unit 140, a controlling unit 150, a legacy transmission controlling unit 160, and two antennas 181 and 182. The antennas 181 and 182 receive and transmit wireless signals.

The transmitting unit 110 transmits signals to the antennas 181 and 182, and the encoding unit 130 encodes data to generate signals to be transmitted to the antennas 181 and 182 by the transmitting unit 110. In order to transmit signals via two or more antennas using an MIMO technique, the signal data must be divided and then encoded separately. Alternatively, in order to transmit signals using channel bonding, the transmitting unit 110 selects two adjacent channels, including a current channel and a directly next channel or a directly previous channel, to be bonded to each other, and transmits the signals via the bonded channels.

The receiving unit 120 receives signals from the antennas 181 and 182, and the decoding unit 140 decodes the signals received by the receiving unit 120 into data. When the data is received using an MIMO technique, it is necessary to integrate the data transmitted via the two channels.

The legacy transmission controlling unit 160 controls short-length data, e.g., an Ack frame, a CTS frame, or an RTS frame, to be transmitted in a legacy format. The control unit 150 manages and controls the exchange of information among various elements of the HT station 100.

Figure 9:
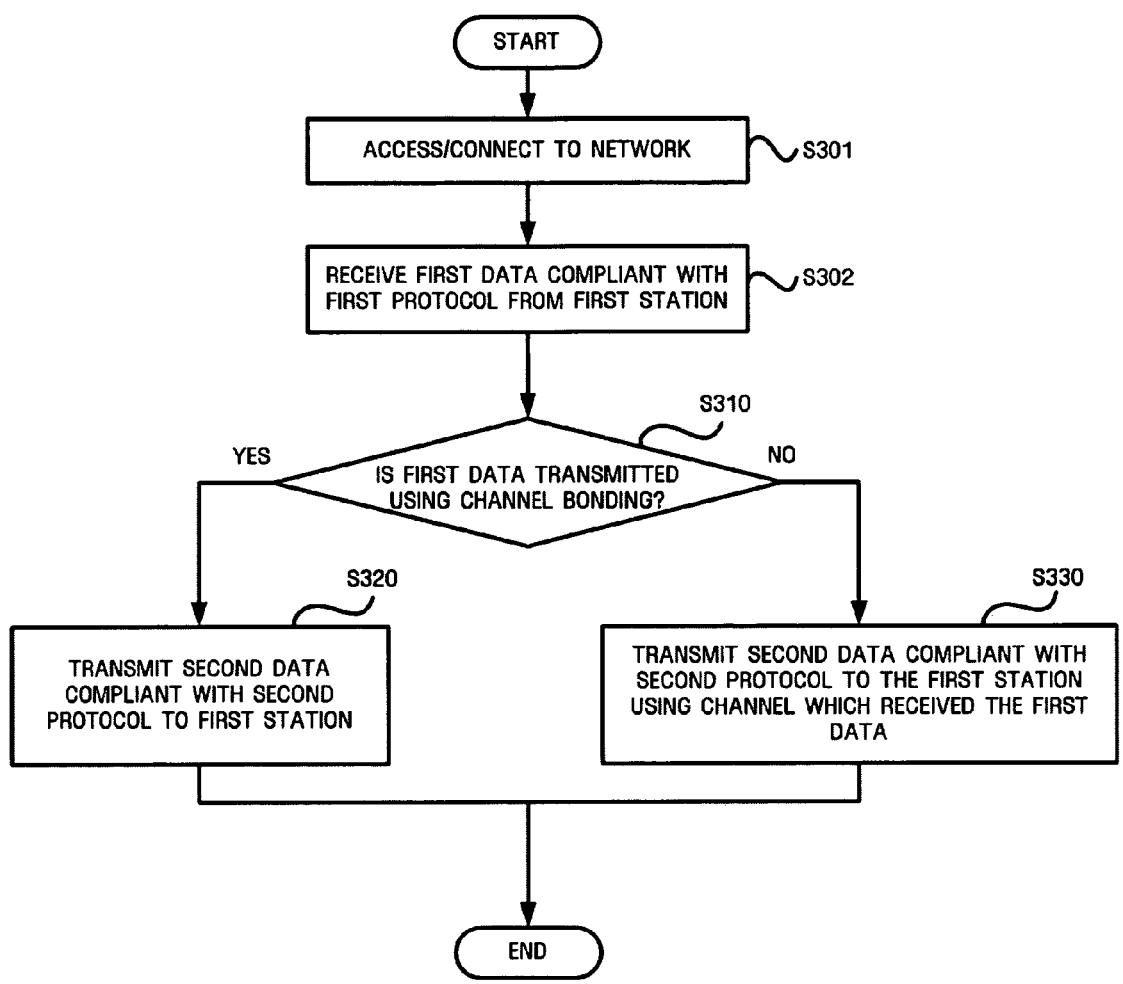
FIG. 9 is a flowchart illustrating a procedure in which an HT station receives an HT frame and transmits a legacy frame as a response frame according to an exemplary embodiment of the present invention.

FIG. 9 is a flowchart illustrating a procedure in which an HT station receives an HT frame and transmits a legacy frame as a response frame according to an exemplary embodiment of the present invention.

The HT station accesses a wireless network in operation S301. In this case, the accessing the wireless network encompasses not only accessing an existing wireless network but also newly generating a wireless network. In an exemplary embodiment, operation S301 may include generating a basic service set (BSS), e.g., an Access Point (AP). Next, a first station existing in the wireless station receives first data compliant with a first protocol in operation S302. The first protocol includes protocols transmitted and received in an HT format, e.g., the IEEE 802.11n protocols. In addition, the first protocol may include protocols having downward compatibility with legacy format protocols.

The term "downward compatibility" used herein means that an upgraded protocol or software is compatible with past proposed protocols or software. For example, the IEEE 802.11n protocols can interpret data that is transmitted and received in the IEEE 802.11a, 802.11b, or 802.11g protocol, and can transmit/receive HT data in the IEEE 802.11a, 802.11b, or 802.11g protocol. The same is true when upgraded software is available to allow data generated from existing version software to be interpreted or managed.

After receiving the first data, it is determined whether the first data is transmitted using channel bonding in operation S310. If the first data is transmitted using channel bonding (YES in operation S310), second data compliant with a second protocol is transmitted via the respective channels used in channel bonding in operation S320. According to the second protocol, frames that can be interpreted by legacy stations receiving channels associated in channel bonding are transmitted. Thus, if the first protocol is compliant with the IEEE 802.11n, the second protocol includes protocols with which the IEEE 802.11n protocol is downward compatible, e.g., IEEE 802.11a, 802.11b, 802.11g, or the like. The transmission procedures have been described above with reference to FIG. 5.

If the first data is transmitted without using channel bonding (NO in operation S310), that is, if the first data is transmitted using, e.g., an MIMO technique, second data compliant with the second protocol is transmitted in operation S330. The transmission procedure has been described above with reference to FIG. 6. As described above, the second protocol includes protocols with which the first protocol is downward compatible.

The wireless network shown in FIG. 8 may be an BSS with an AP, or an Independent Basic Service Set (IBSS) without an AP. The second data is short data including control frames, such as Ack, CTS, RTS, etc.

The second data can be interpreted by legacy stations, so that the legacy stations can perform virtual carrier sensing.

Accordingly, the use of the second data enhances transmission efficiency in a wireless network without legacy stations.

As described above, according to exemplary embodiments of the present invention, when HT stations and legacy stations each having different transmission capabilities coexist in a wireless network, the legacy stations can perform virtual carrier sensing.

In addition, according to exemplary embodiments of the present invention, short data is transmitted in a legacy format, thereby enhancing transmission efficiency.

It will be understood by those of ordinary skill in the art that various changes in form and details may be made therein without departing from the spirit and scope of the present invention as defined by the following claims. Therefore, it is to be appreciated that the above described exemplary embodiments are for purposes of illustration only and not to be construed as a limitation of the invention. The scope of the invention is given by the appended claims, rather than the preceding description, and all variations and equivalents which fall within the range of the claims are intended to be embraced therein.

What is claimed is:

1. A method for transmitting and receiving data in a wireless network, the method comprising:
    at a high-throughput station, transmitting first data including data with a legacy format and data with a high-throughput format via a bonded channel which is formed by channel bonding first and second adjacent channels; and
    at the high-throughput station, receiving second data with a legacy format via each of the first and second adjacent channels as a response to the transmitted first data,
    wherein the first data is a request-to-send (RTS) frame, and the second data is a clear-to-send (CTS) frame which responds to the RTS frame.

2. The method of claim 1, wherein the wireless network is compliant with the IEEE 802.11n standard.

3. The method of claim 1, wherein the legacy format is compliant with at least one of the IEEE 802.11a standard, the IEEE 802.11b standard and the IEEE 802.11g standard.

4. The method of claim 1, wherein the received second data is simultaneously and separately transmitted on each of the first and second adjacent channels without channel bonding.

5. The method of claim 1, wherein the first data and the second data are simultaneously and separately transmitted.

6. The method of claim 1, wherein the second data is transmitted from another high-throughput station.

7. A wireless network apparatus in a wireless network, the wireless network apparatus comprising:
    a transmitting unit that transmits first data including data with a legacy format and data with a high-throughput format via a bonded channel which is formed by channel bonding first and second adjacent channels; and
    a receiving unit that receives second data with a legacy format via each of the first and second adjacent channels as a response to the transmitted first data,
    wherein the first data is a request-to-send (RTS) frame, and the second data is a clear-to-send (CTS) frame which responses to the RTS frame, and
    wherein the apparatus is a high-throughput station.

8. The wireless network apparatus of claim 7, wherein the wireless network is compliant with the IEEE 802.11n standard.

9. The wireless network apparatus of claim 7, wherein the legacy format is compliant with at least one of the IEEE 802.11a standard, IEEE 802.11b standard and IEEE 802.11g standard.

10. The wireless network apparatus of claim 7, wherein the received second data is simultaneously and separately transmitted on each of the first and second adjacent channels without channel bonding.

11. The wireless network apparatus of claim 7, wherein the first data and the second data are simultaneously and separately transmitted.

12. The wireless network apparatus of claim 7, wherein the second data is transmitted from another high-throughput station.

* * * * *